ULTRA HIGH FREQUENCY ATTENUATOR

Filed Oct. 21, 1959

INVENTORS
Harry R. Foster
Elmo E. Crump

BY
Munn, Liddy, Daniels & Marsh
ATTORNEYS 3,049,683
Patented Aug. 14, 1962

3,049,683

ULTRA HIGH FREQUENCY ATTENUATOR

Harry R. Foster, Montville, and Elmo E. Crump, West Caldwell, N.J., assignors to Ohmega Laboratories, Pine Brook, N.J., a corporation of New Jersey Filed Oct. 21, 1959, Ser. No. 847,796
5 Claims. (Cl. 333—81)

This invention relates to devices intended to control electrical energy in the high frequency or R.F. ranges, and more particularly to variable attenuator devices for use with ultra high frequency transmission lines, to effect a control of energy passing along such lines.

The device of the invention has special utility in conjunction with circuits for effecting an automatic gain control for high frequency energy, as for example in connection with the producing of such energy by a signal generator. Where the output of such signal generator is subject to variation, the device of the present invention may be advantageously utilized in a suitable circuit to eliminate or substantially reduce variations in the output energy. However, it should be understood that the invention is not limited to the above use, but instead has utility generally in connection with the control of high frequency energy passing along a transmission line, regardless of the end result for which such control may be utilized.

An object of the invention is to provide a novel and improved high frequency energy attenuator in conjunction with a transmission line or transmission means, by which a desirable and advantageous control of the energy passing said line or means may be readily effected.

Another object of the invention is to provide an improved high frequency energy attenuator device as above set forth, which is especially adapted for use in automatic gain control circuits to provide a high degree of uniformity in the level of the high frequency energy.

A further object of the invention is to provide an improved attenuator-type high frequency control device as above set forth, wherein the energy may be controlled over a wider range of values, as for example at least on the order of fifteen decibels magnitude.

A feature of the invention resides in the provision of an improved attenuator-type high frequency energy control employing an electro-magnetic component, wherein simple and effective field shielding means are provided to isolate the said component from the high frequency energy of the transmission line or transmission means.

Still another object of the invention is to provide an improved attenuator-type device for controlling ultra high frequency or R.F. energy, which device employs relatively few components of extremely simple construction, and is simple and economical to fabricate and produce.

Yet another object of the invention is to provide an attenuator device for R.F. energy, which device may be made relatively small in size and compact in its organization, and which may be variously positioned and oriented with respect to the transmission line or means, thereby to facilitate the utilization and placement of the device in all types of equipment.

A still further object of the invention is to provide an improved variable control attenuator device for R.F. energy in accordance with the foregoing, which may be relatively light in weight, thereby to adapt it for airborn equipment and the like.

Other features and advantages will hereinafter appear.

In the drawings accompanying this specification, similar characters of reference have been used to designate like components or parts throughout the several views, in which.

Figure 1:
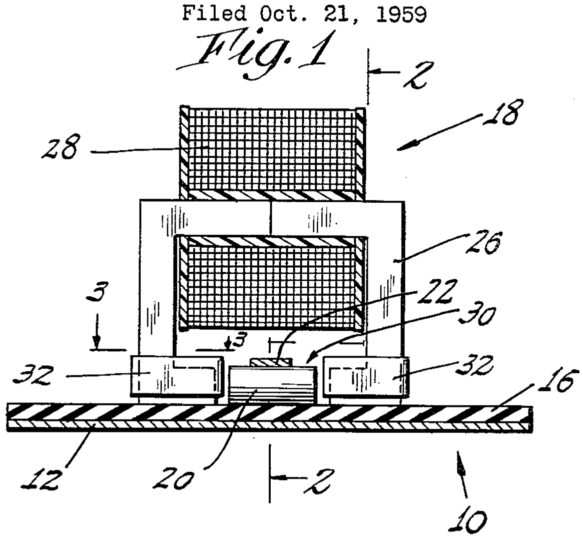
FIG. 1 is a transverse sectional view taken through a high frequency transmission line or strip and through the improved variable attenuator type control device as provided by the invention.

Referring to the figures, the numeral 10 designates generally an ultra high frequency transmission line or means, of a known type. The transmission line 10 may comprise a relatively wide, flat conductor 12 generally known as a ground plane, the said conductor being in the form of an elongate member or strip having substantial width as indicated in FIG. 1. The ground plane conductor 12, as is well understood, may be connected to the ground side, casing or chassis of a generator for high frequency or R.F. energy, in the usual manner.

The transmission line 10 further compirses an elongate, high frequency or "hot" conductor 14 arranged in spaced relation to the ground plane 12 and shown as insulated from the ground plane along the length of the transmission line. To conveniently effect such insulation, the transmission line 10 may have an insulating sheet 16 interposed between the ground plane 12 and the conductor 14.

In accordance with the present invention, in conjunction with the transmission line 10 there is provided a novel, simple and effective variable high frequency attenuator device, by which an advantageous control and variable attenuation of the energy passing along the transmission line 10 may be had. This novel control is characterized by relatively few non-moving parts or components of simple construction, whereby the fabrication and production of the device may be economically effected.

Figures 2, 4, 5:
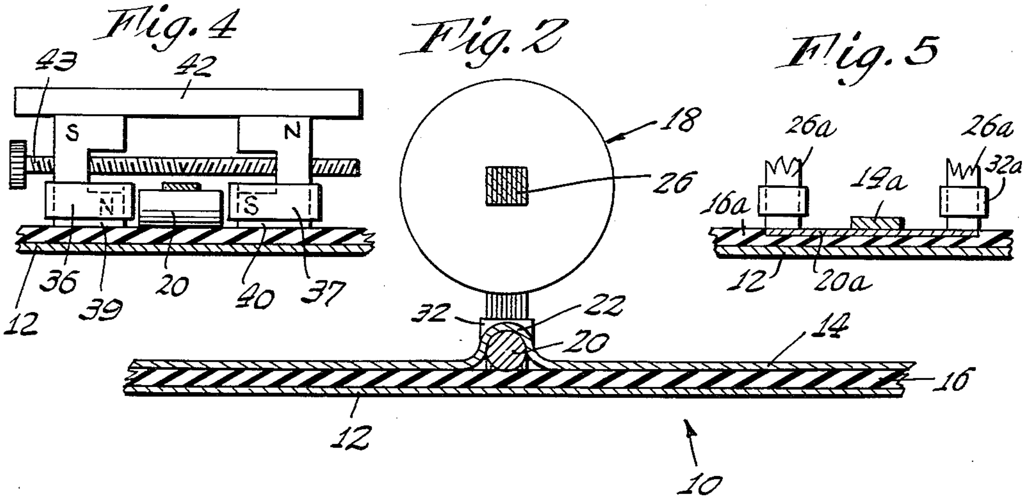
FIG. 2 is a fragmentary longitudinal sectional view, taken on the line 2—2 of FIG. 1.
FIG. 4 is a view like FIG. 1, but showing a different type of variable attenuator type control device in accordance with the invention.
FIG. 5 is a fragmentary view of a modified form of variable attenuator type control device made in accordance with the invention, this figure showing the high frequency transmission line in transverse section.

Referring to FIGS. 1 and 2, the present variable, high frequency attenuator device comprises essentially an electromagnetic control component designated generally by the numeral 18, together with a magnetic control member 20 which latter is constituted of magnetic material having dielectric properties. The member 20 may be constituted of any suitable material, as for example a ferrous composition known commercially as "ferrite." The magnetic member 20 is interposed between the ground plane 12 and the conductor 14 of the transmission line adjacent the latter, and preferably the conductor 14 is provided with a raised portion 22 as clearly shown in FIGS. 1 and 2, to accommodate the member 20.

As shown, the magnetic member 20 may be conveniently made in the form of a solid cylindrical slug having a length substantially in excess of the width of the R.F. conductor 14, see FIG. 1.

The disposition of the magneitc slug 20 between the conductor 14 and the ground plane 12 and in juxtaposition to the conductor "places the slug within the propagated field of the high frequency transmission line."

"In accordance with the invention, the electro-magnetic control component 18 is utilized to produce a control flux in the slug 20. The amount of flux passing through the slug determines the amount of loss presented to the propagated wave along the high frequency transmission line. In this particular unit a maximum amount of flux gives a minimum amount of loss."

The electro-magnetic control component 18 comprises a magnetic core or yoke 26 in which flux is produced by an electrical energizing coil 28 whose winding is arranged to be energized by the application of a suitable control voltage thereto.

The core 26 may have various forms or shapes, it being preferably so arranged that in conjunction with the magnetic slug 20 there is provided virtually a complete magnetic circuit to carry the flux produced by the coil 28 when the latter is energized. This is, the core 26 may be continuous except for the existence of a cut or gap 30, in which the magnetic slug 20 is interposed. Depending on the strength or degree of energization of the coil 28, a greater or lesser air gap may exist between the ends of the magnetic slug 20 and the ends of the core 26.

By the present invention use is made of such air gap to effect a shielding of the core 26 and coil 28 in conjunction with conductive split rings or shielding members whereby the coil and core are effectively isolated from the R.F. energy which passes along the transmission line 10.

Figure 3:
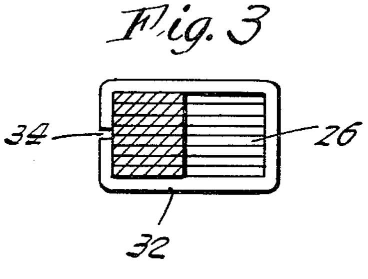
FIG. 3 is a fragmentary horizontal sectional view, taken on the line 3—3 of FIG. 1.

As shown in FIGS. 1 and 3, the said shielding means comprises a pair of split, rectangular rings 32 which are carried by the lower portions of the core 26 and arranged substantially at the same level as the magnetic slug 20 on opposite sides of the R.F. conductor 14. The rings 32 have cuts or gaps 34 whereby they are discontinuous, thereby to avoid a short-circuiting or quenching action with respect to voltages induced in them by the low frequency field existing in the core 26 by virtue of the low frequency energization of the coil 28. However, the shielding rings 32 are effective in shielding the high frequency circuit represented by the transmission line 10, from the core 26 and the coil 28.

The operation of the present inproved attenuator-type control as above set forth, is as follows: High frequency energy traveling along the transmission line or means 10 will cause a field or flux to exist about the conductor 14. Such flux will be present and concentrated in the magnetic member 20 but the mere presence of the member will not adversely affect the transmission line energy due to its dielectric properties. By suitable energization of the coil 28, a flux may be produced in the core 26, the said flux existing also in the member 20 which constitutes a portion of the magnetic circuit for the coil 28. The flux in the magnetic member 20 will act on the propagated field, thereby effecting an attenuation of the high frequency energy passing along the line. The greater the energization of the coil 28 and the greater the value of the flux created thereby in the core 26 and magnetic member 20, the less will be the attenuation of the R.F. energy in the transmission line 10, and vice versa. By automatically regulating the energy or voltage impressed on the coil 28, as by connecting the said coil into a suitable automatic gain control circuit, an automatic control of the energy in the line 10 may be had. Accordingly, where the line is connected to the output of an R.F. generator which is subject to variation, a stabilization of the said output will be had, and a more uniform value of output energy will be delivered at the termination of the transmission line 10 as a consequence of the provision of the variable attenuator.

It will be understood from the foregoing that the present attenuator device employs relatively few parts or components of simple construction, and that it may be made relatively small and compact whereby it will require little space and represent relatively little weight. While the energizing coil 28 and core 26 are shown as disposed above the ground plane conductor 12, it will be understood that these components may have other dispositions and the core 26 may be placed below the ground plane 12.

Other means may be utilized to effect a variable control flux in the magnetic member 20. For example, as shown in FIG. 4 a pair of permanent magnets 36, 37 may be arranged on opposite sides of the magnetic member 20, said magnets having north and south poles 39 and 40 respectively, disposed adjacent the ends of the member 20. The remaining poles of the permanent magnets 36, 37 may be arranged for sliding movement along a magnetic yoke 42, and an adjustment screw 43 having both left-and right-hand threads may be threaded into the permanent magnets, to enable these to be brought closer together or else shifted further away from each other. With this organization, a change in the positions of the permanent magnets will change the strength of the flux induced in the magnetic member 20, and the higher the value of flux in the member 20 the less will be the attenuation of the R.F. energy in the transmission line 10, and vice versa.

Referring now to FIG. 5 there is illustrated a modification of the invention wherein the flux-carrying member which controls the radio frequency energy is disposed in the insulating sheet located between the conductor and ground plane of the transmission line. As shown, the ground plane 12 and the conductor 14 are separated by an insulating or dielectric sheet 16*a*, in which there is disposed a magnetic slug 20*a*, the arrangement being such that a U-shaped core 26*a* may be engaged with end portions of the slug 20*a*. Shielding rings 32*a* are carried by the core 26*a*. With this organization it is unnecessary to displace any portion of the radio frequency conductor 14*a*, as is done in the embodiment of the invention illustrated in FIGS. 1 and 2.

We have found that an attenuator control as above set forth is extremely effective in dealing with variations in the output of an R.F. generator, and that a range of about fifteen decibels may be had with this device. By the provision of the split rings 32 an effective shielding is made from the R.F. energy in the line 10, whereby the effect of such energy on the core 26 and coil 28 is minimized. Also, the provision of such shields does not appreciably adversely effect the energy passing along the line 10, and has no effect on the control flux produced in the core 26 and magnetic slug 20 by the coil 28.

Variations and modifications may be made within the scope of the claims, and portions of the improvements may be used without others.

We claim:

1. In combination, a high-frequency transmission line comprising an elongated conductor and a ground plane spaced from and associated with the said conductor; and a variable attenuator comprising a flux-conducting member of magnetic material having dielectric properties, disposed between the ground plane and the said conductor adjacent the latter and comprising magnetic means having poles disposed at opposite sides of the conductor for effecting a variable and controlled magnetization of said flux-conducting member where the flux therein determines the amount of electro-magnetic energy passing along the high frequency transmission line, said poles comprising flux-conducting members, said poles being spaced by an air gap from said flux conducting member, said poles having high-frequency shielding means comprising slitted metal rings extending around said poles and into said air gaps.

2. The invention as defined in claim 1, in which the elongate conductor has a portion displaced laterally from the ground plane to provide an enclosure with open ends therebetween, and in which the flux-conducting member is disposed at the said laterally displaced portion, occupying the place where the space within the enclosure is provided and being accessible at the said open ends.

3. The invention as defined in claim 1, in which there is a dielectric sheet disposed between the conductor and the ground plane, and in which the flux conducting member is located in the said dielectric sheet.

4. The combination as defined in claim 1, in which the magnetic means comprises permanent magnets and means for shifting said magnets to vary the size of the air gaps between the poles and the flux-conducting member.

5. The combination as defined in claim 1, in which the magnetic means comprises electromagnetic means adopted to be energized by application of a control voltage thereto.

References Cited in the file of this patent

UNITED STATES PATENTS

| | | |
|---|---|---|
| 2,650,350 | Heath | Aug. 25, 1953 |
| 2,755,447 | Engelmann | July 17, 1956 |
| 2,798,207 | Reggia | July 2, 1957 |
| 2,820,951 | Jones | Jan. 21, 1958 |
| 2,850,701 | Fox | Sept. 2, 1958 |
| 2,934,723 | Hewitt | Apr. 26, 1960 |

FOREIGN PATENTS

| | | |
|---|---|---|
| 216,563 | Australia | Aug. 6, 1958 |